Patented June 4, 1929.

1,716,014

UNITED STATES PATENT OFFICE.

MAURICE C. TAYLOR, OF NIAGARA FALLS, NEW YORK, ASSIGNOR TO THE MATHIESON ALKALI WORKS, INC., OF NEW YORK, N. Y., A CORPORATION OF VIRGINIA.

COMPOSITION FOR PRODUCING HYPOCHLORITE SOLUTIONS.

No Drawing.  Application filed March 11, 1927. Serial No. 174,699.

This invention relates to an improved composition for the preparation of solutions of alkali-metal hypochlorites such as sodium hypochlorite.

Solutions of sodium hypochlorite have previously been prepared in a number of ways. One has been to treat solutions of bleaching powder with sufficient sodium carbonate to precipitate all the calcium as calcium carbonate and to separate the resulting solution from the precipitate. Solutions so prepared will generally contain a substantial amount of sodium hydroxide, particularly if the bleaching powder contains much free lime. Another has been to chlorinate solutions of caustic soda. Free sodium hydroxide is usually left in such solutions to stabilize them.

Patent No. 1,481,003 describes compositions containing a hypochlorite compound of calcium and a sodium salt such as sodium carbonate which on being dissolved in water form solutions containing sodium hypochlorite, but for some purposes it would be desirable to elimiate the accompanying precipitation of some calcium salt.

This invention comprises a new composition containing an alkali-metal compound forming an alkaline aqueous solution and a chloramine soluble in an aqueous solution thereof which on being dissolved in water forms a solution containing the hypochlorite of the alkali-metal. This composition avoids objections incident to methods previously used for preparing such solutions and is very convenient to use. The composition is a solid and is completely soluble in water. The composition can be prepared to give solutions containing only a fraction of one percent of alkali-metal hydroxide, substantially free from free alkali. By using more stable chloramines, the composition can be made stable for long periods at ordinary room temperatures.

A composition embodying the invention can be prepared by mixing equal parts of para-toluene-sulfon-benzoyl-nitrogen chloride, $CH_3C_6H_4SO_2N(Cl)COC_6H_5$, and sodium carbonate. Such a mixture will contain ten percent to twelve percent available chlorine and will be completely soluble in water.

Other sodium compounds useful in the composition of the present invention include trisodium phosphate, sodium fluoride, sodium tetraborate and sodium hydroxide, and similar results are obtained with corresponding compounds of other alkali-metals. Among other chloramines useful for the purposes of this invention are p-toluene-sulfon-acetyl nitrogen chloride, benzene-sulfon-benzoyl nitrogen chloride and benzene-sulfon-acetyl nitrogen chloride, 2-6-dichlor-4-nitro-phenyl-acetyl nitrogen chloride and 2-4-6 trichlor-phenyl-chloracetyl nitrogen chloride.

All of the chloramines are not of equal solubility in aqueous solutions of various alkali-metal compounds, so that certain chloramines are more particularly suited for use with certain alkali-metal compounds than with others. For example, 2-4-6-trichlor-phenyl-chlor-acetyl nitrogen chloride is quite soluble in sodium hydroxide solutions, slightly soluble in trisodium phosphate solutions, and comparatively insoluble in solutions of sodium carbonate and sodium fluoride, whereas para-toluene-sulfon-benzoyl nitrogen chloride is comparatively soluble in solutions of all of the sodium compounds mentioned. Accordingly, to obtain stronger solutions of sodium hypochlorite with 2-4-6-trichlor-phenyl-chlor-acetyl nitrogen chloride, it would be employed in conjunction with sodium hydroxide. Compositions containing 2-6 dichlor-4-nitro-phenyl-acetyl nitrogen chloride form solutions which are somewhat colored.

The improved composition of the present invention is particularly adapted for surgical and pharmaceutical use. It is also useful generally for disinfecting as well as for bleaching and other purposes for which solutions of hypochlorites can be employed.

I claim:

1. A composition dissolving in water to form a solution containing an alkali-metal hypochlorite comprising an alkali-metal compound forming an alkaline aqueous solution and a hypochlorite-forming chloramine soluble in an aqueous solution thereof.

2. A composition dissolving in water to form a solution containing an alkali-metal hypochlorite comprising an alkali-metal compound forming an alkaline aqueous solution and a hypochlorite-forming substituted nitrogen chloride soluble in an aqueous solution thereof.

3. A composition dissolving in water to form a solution containing an alkali-metal hypochlorite comprising an alkaline alkali-metal compound and a compound comprising the group NCl—CO.

4. A composition dissolving in water to form a solution containing an alkali-metal hypochlorite comprising an alkaline alkali-metal compound and a substituted sulfon nitrogen chloride.

5. A composition dissolving in water to form a solution containing an alkali-metal hypochlorite comprising an alkaline alkali-metal compound and a compound comprising a group $SO_2$—NCl—CO.

6. A composition dissolving in water to form a solution containing an alkali-metal hypochlorite comprising an alkaline alkali-metal compound and a compound of the general formula R—$SO_2$—NCl—CO—R′; in which R and R′ are organic radicals.

In testimony whereof I affix my signature.

MAURICE C. TAYLOR.